June 3, 1969  P. W. BOTHWELL ET AL  3,447,163

SAFETY HELMETS

Filed Feb. 13, 1967  Sheet 1 of 4

United States Patent Office 3,447,163
Patented June 3, 1969

3,447,163
SAFETY HELMETS
Peter W. Bothwell, 7 Red House Lane, Westbury-on-Trym, Bristol, England, and John M. Tojeiro, Townsend House, Barkway, near Royston, Hertfordshire, England
Filed Feb. 13, 1967, Ser. No. 615,723
Claims priority, application Great Britain, Feb. 16, 1966, 6,864/66; May 12, 1966, 21,179/66
Int. Cl. A42b 1/08
U.S. Cl. 2—3        2 Claims

ABSTRACT OF THE DISCLOSURE

A safety helmet comprising an outer shell formed as a double skin member joined around the periphery and containing an impact energy absorbing material. The helmet is provided with a chin strap having a plug-in type fastener receivable in a recess in the interspace between the skins of the shell.

---

This invention relates to safety helmets, and particularly to such helmets (otherwise known as crash helmets) intended for use by motorcyclists and/or racing motorists. Such helmets generally comprise an outer shell to resist penetration by sharp-edge objects and a layer or layers of shock-absorbing material inside the shell.

According to the present invention, a safety helmet comprises an outer shell formed as a double-skinned member, the two skins of the shell being joined to one another around the periphery of the shell by a gently curved peripheral portion exhibiting no sharp edges, and the interspace between the skins containing a material capable of absorbing impact energy on deformation. This material preferably comprises a layer of a honeycomb type of material, e.g. of resin impregnated linen, the cells of the honeycomb layer being filled with an energy-absorbing foamed material.

The spacing between the skins of the shell may be substantially uniform over the whole area of the shell, or it may be greatest in the temporal areas where damaging impacts most commonly occur.

Within the inner skin of the double-skinned outer shell, the helmet preferably comprises one or more further layers of shock-absorbing material, the innermost layer being adapted to fit the wearer's head.

The double-skinned outer shell offers greater resistance to penetration than a conventional single-skin shell, and at the same time it provides a further force-attenuating barrier in addition to the normal shock-absorbing material within its inner shell. The double-skinned outer shell is also less easily compressed or dented than the normal single-skin shell, particularly in the downward-extending ear-protecting areas which are now normally provided on all helmets but which are generally less strong than the main domed part of the helmet. The gently curved shape of the peripheral portion is important for avoiding risk of injury to the wearer's neck, by eliminating all sharp edges from the periphery of the helmet.

The honeycomb layer is in most cases so arranged that the axes of the cells are perpendicular to the adjacent surfaces of the skins of the shell. In some cases, however, the cells may be disposed with their axes parallel to the skins or at angles thereto which differ in different areas of the shell, so as to provide zones in which the outer shell will compress more readily in response to tangential impacts. In this way the helmet can be adapted to provide maximum energy absorption for the commnest types of tangential impacts, e.g. those on the temporal areas.

Figure 1:
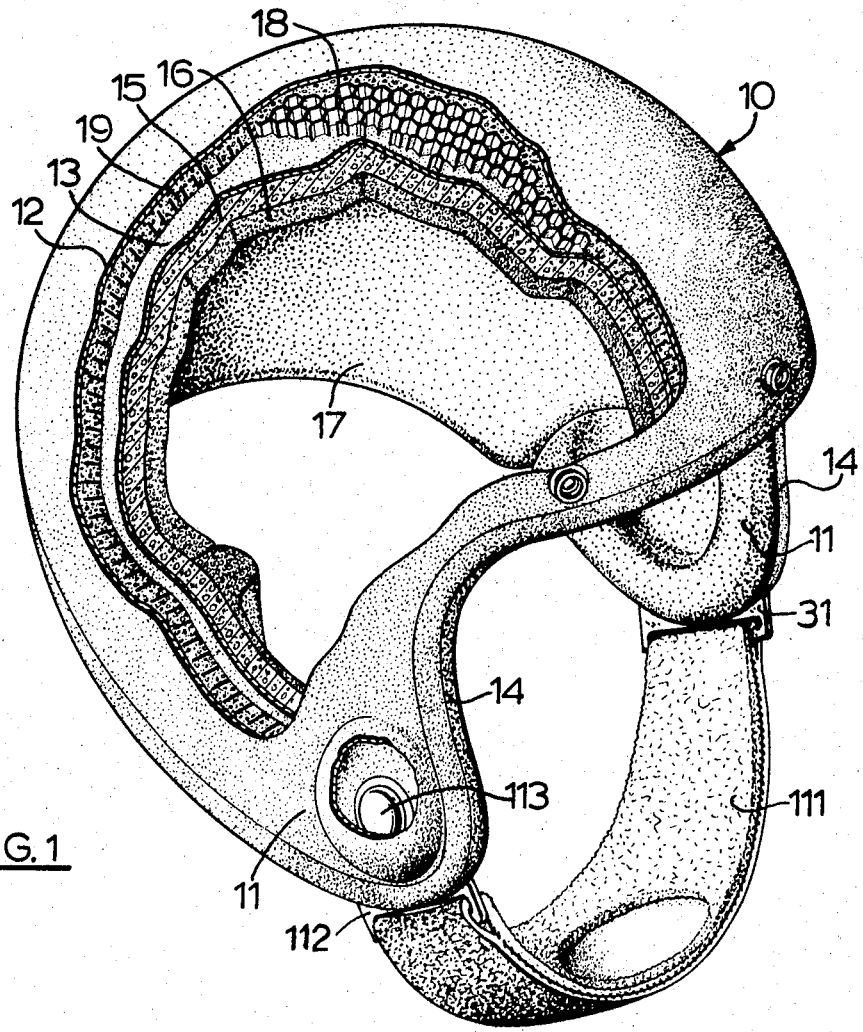
Figure 4:
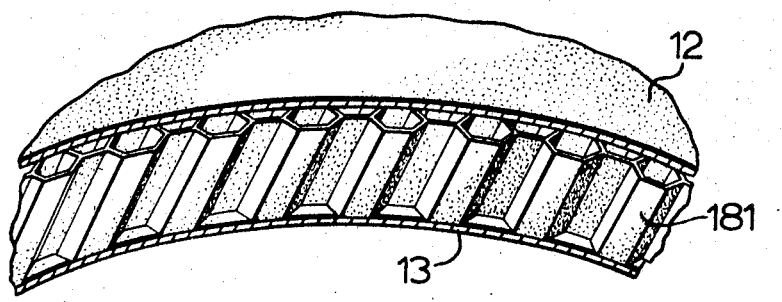
Figure 3:
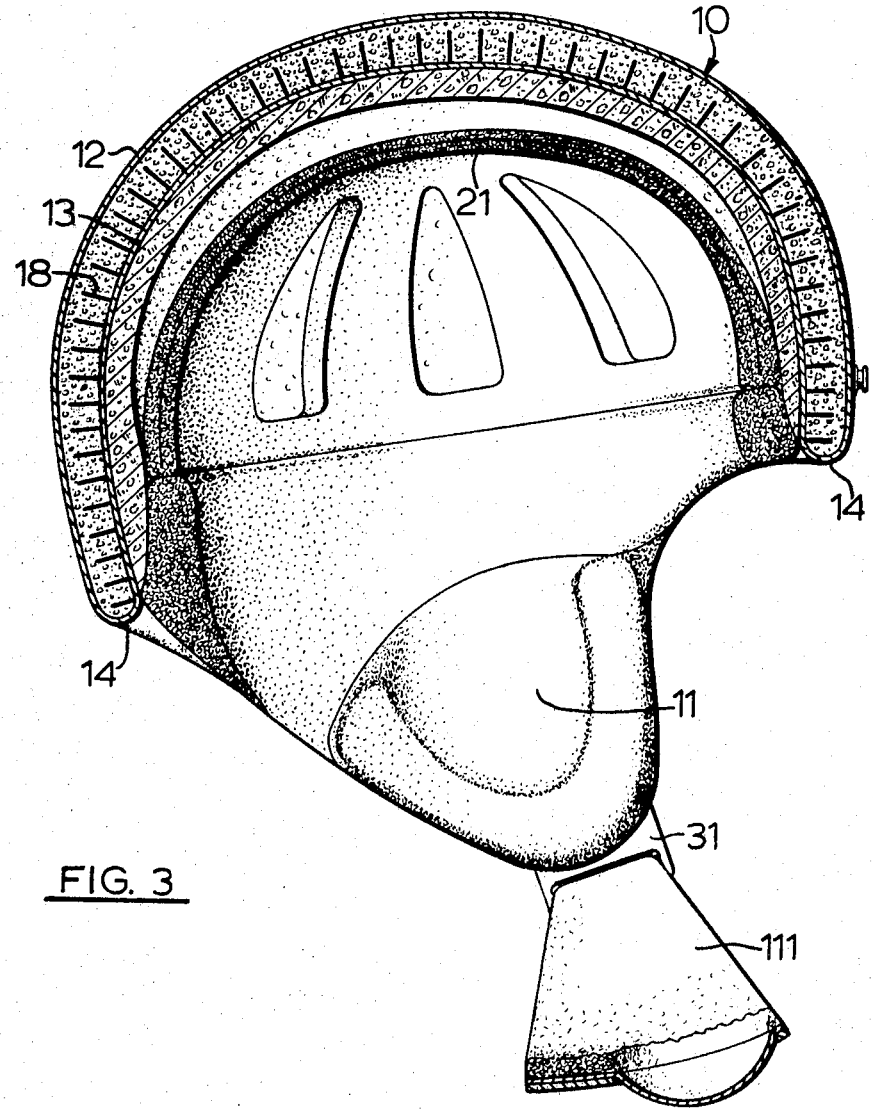
Figure 2:
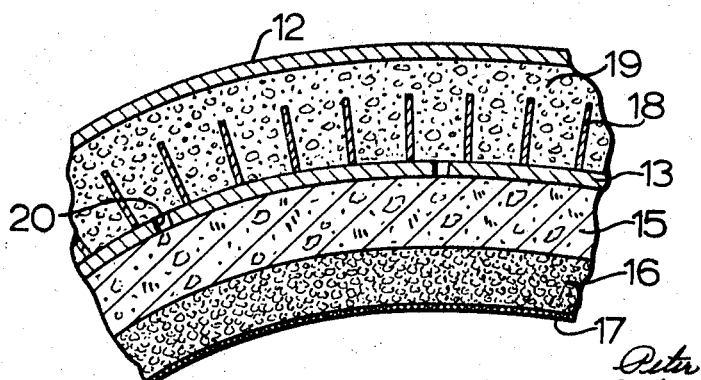
Figure 6:
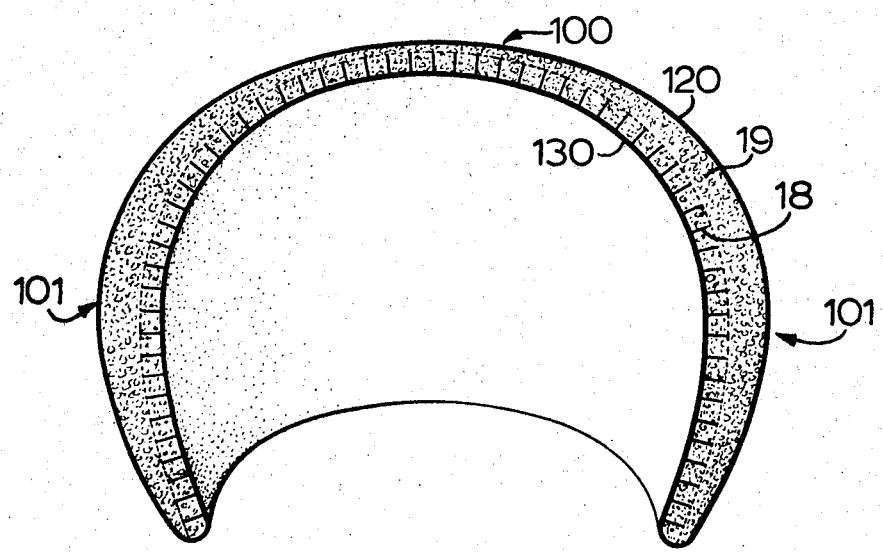
Figure 5:
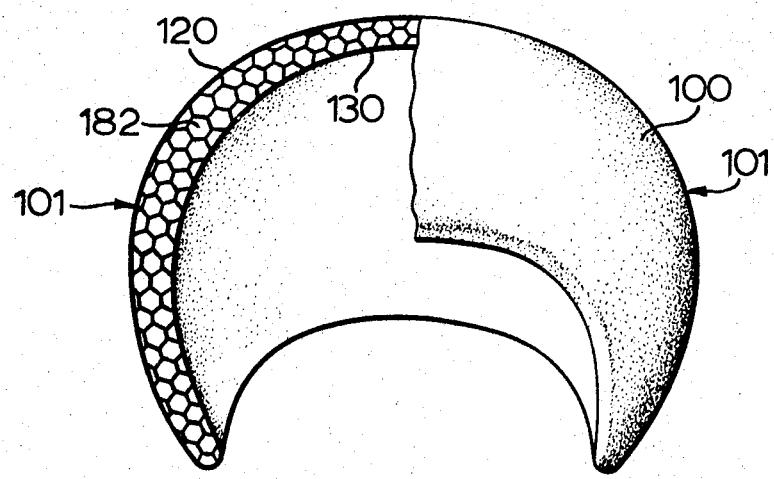
Figure 7:
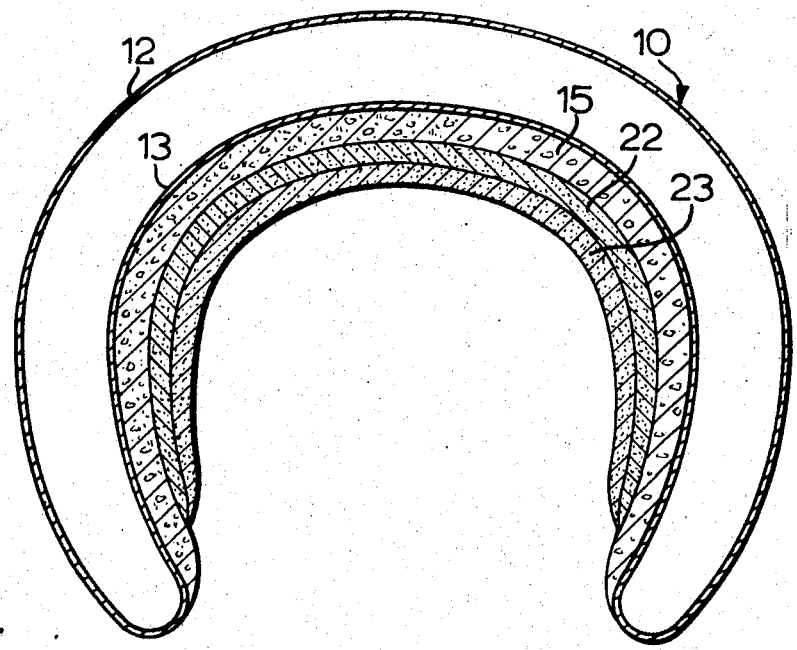
Figure 8:
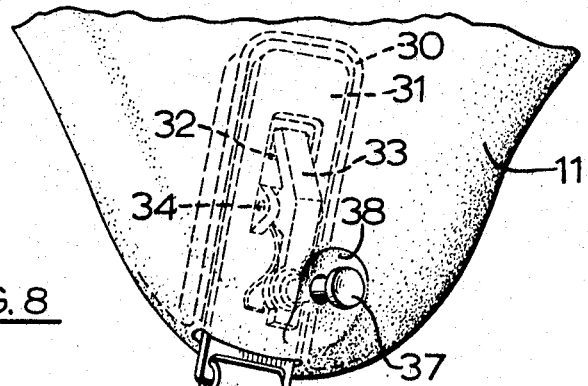
Figure 9:
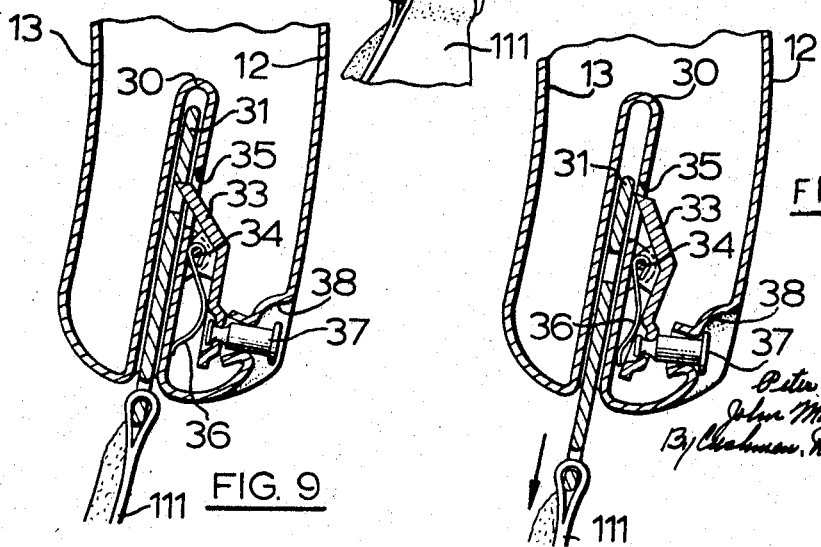
Figure 10:
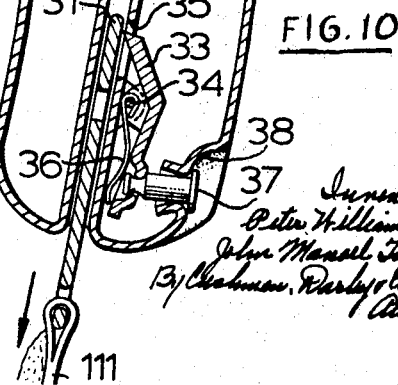

Specific embodiments of the invention will now be described in more detail by way of example and with reference to the accompanying drawings, in which:

FIG. 1 is a perspective view of a safety helmet having a double-skinned outer shell, with parts broken away to show the construction, FIG. 2 is an enlarged detail cross-section through a part of the helmet of FIG. 1, FIG. 3 is a longitudinal cross-section through a helmet similar to that of FIGS. 1 and 2, but having a cradle instead of an inner lining, FIG. 4 is a detail sectioned view through a modified form of double-skinned outer shell, FIG. 5 is a transverse section through another modified form of double-skinned outer shell, FIG. 6 is a similar view of yet another modified form of shell, FIG. 7 is a transverse section through a helmet as shown in FIG. 1, with additional head-fitting liners, FIG. 8 is a perspective view of a fastening for the helmet chin strap, and FIGS. 9 and 10 are sectional views showing the fastening of FIG. 8 in the engaged and released condition, respectively.

In the embodiment shown in FIGS. 1 and 2 of the drawings, the helmet comprises an outer shell 10 of dome shape having downward projections 11 at each side to protect the ears of the wearer. The outer shell 10 consists of a pair of spaced skins 12, 13 which may for example be of glass-fibre reinforced plastic material, joined to one another (e.g. by bonding) around the periphery of the shell by a gently curved peripheral portion 14. Within the inner shell 13, the helmet has a lining 15 of cork or similar shock-absorbing material and inside the cork lining 15 is a layer 16 of foamed polyurethane or similar softer shock-absorbing material. A final internal lining 17 of cloth covers the inside of the polyurethane foam layer 16. A chin strap 111 is attached at one end by a plate 112 and rivet 113 to the inner skin 13 of the outer shell 10, and at its other end has a plug-in fastener 31 described in more detail below with reference to FIGS. 8, 9 and 10.

The interspace between the two skins 12, 13, of the outer shell 10 contains a honeycomb material 18, e.g. of resin impregnated linen or paper or glass fibre cloth, secured to the outer surface of the inner skin 13, the cells of the honeycomb material 18 having their axes at right angles to the adjacent surfaces of the skins 12, 13 and the top of the cells being spaced from the inner surface of the outer shell 12. The whole interspace between the skins 12 and 13 is filled with a foamed material 19 which is capable of absorbing impact energy on deformation (e.g. a polyurethane foam). Apertures 20 (FIG. 2) in the inner skin 13 ensure that the interspace is not airtight, so as to avoid transmission of shocks by trapped air acting as a spring. The double-skinned shell 10 has a high resistance to penetration and excellent force-attenuating qualities due to the foam and honeycomb material within it.

The shell 10 may be built up by first forming the inner and outer skins 12, 13 separately, and then bonding or otherwise attaching the honeycomb layer 18 to the inner skin 13 so that it takes up the required curvature. The honeycomb layer 18 may be pre-formed to the curved shape of the shell 10 before being attached to the inner skin 13, if desired. Thereafter, the outer skin 12 is attached to the inner skin 13 around their edges. A foam-generating material is then injected into the interspace between the skins 12, 13 so that the foam fills firstly the free space between the honeycomb layer 18 and the outer skin 12 and then the cells of the honeycomb layer 18.

Alternatively, the honeycomb layer 18 may be attached to the outer skin 12, or allowed to float between the two skins. In another alternative, the honeycomb layer 18 is filled with foam 19 before being placed over the inner skin 13 and the outer skin 12 is attached subsequently.

The foam and honeycomb materials used in the interspace are such as to absorb impact energy on deformation, and for this purpose the materials used must either have no resilience but collapse and deform permanently on impact, or, if they do recover their original form, must do so only slowly so as to avoid transmitting shocks through the shell 10.

The foamed material 19 may be arranged to have different densities in different areas of the shell 10, if desired, to give different compressibility characteristics in such areas.

The helmet shown in section in FIG. 3 is similar to that shown in FIGS. 1 and 2 in all respects except that the inner polyurethane layer 16 and cloth lining 17 are omitted and replaced by a cradle 21, of conventional form but made of thick polyurethane, adapted to fit the wearer's head. This sectional view shows clearly the gentle curvature of the peripheral portion 14 of the outer shell 10, here shown as having a constant radius of curvature. In other cases, the radius of curvature of the peripheral portion 14 may be varied, as seen in cross-section, so that the radius is greater on the side facing towards the wearer. It will also be seen that the spacing between the skins 12, 13 of the outer shell is constant over the whole area of the shell 10.

As shown in FIG. 4, the axes of the cells of the honeycomb layer 181 may alternatively be disposed at different angles to the adjacent surfaces of the skins 12, 13 in different areas of the outer shell 10 to give different compressibility characteristics.

In another alternative, as shown in the sectional part of FIG. 5, the honeycomb layer 182 may have its cells disposed with their axes parallel to the surfaces of the skins 12 and 13. In this case, the honeycomb material fills the interspace between the skins 12, 13 and the cell axes follow the curvature of the shell 10; the cells are filled with foamed material from one end.

In the embodiments illustrated in FIGS. 5 and 6, the outer shell 100 has inner and outer skins 120 and 130 whose spacing varies over the area of the shell, being greatest in the side portions 101 covering the wearer's temples, where experience has shown that injuries most commonly occur. In the embodiment of FIG. 6, the shell 100 contains a honeycomb material 18 and foam 19 similar to those shown in FIGS. 1 to 3.

FIG. 7 shows a sectional view of a further alternative embodiment. The outer shell 10 comprises skins 12 and 13, and the interspace will contain honeycomb material and foam as shown in any of the preceding figures. A cork layer 15 is secured to the inside of the inner skin 13 as in FIGS. 1 to 3. In order to obtain a close and comfortable fit to the wearer's head, a series of thin liners of soft polyurethane material, such as those shown at 22 and 23, are supplied and the requisite number to suit the particular wearer are secured inside the cork layer 15.

FIGS. 8, 9 and 10 show a fastening for the chin strap 111 which is designed to eliminate any metal elements which might be capable of causing injury from positions near the wearer's face. The peripheral portion 14 of the outer shell 10 is formed with a deep inwardly extending recess 30 and the chin strap 111 is provided with a metal tongue 31 capable of fitting within the recess 30 and having an aperture 32. A cranked catch 33 is pivoted at 34 on the outer wall of the recess 30. Its upper arm passes through an aperture 35 in the outer wall of the recess 30 and can engage within the aperture 32 in the tongue 31 to prevent the latter from being withdrawn. A leaf spring 36 urges the catch 33 into the engaged position shown in FIG. 9. A press button 37 housed within a recess 38 in the outer skin 12 engages the other arm of the catch 33 so that pressure on the press button 37 rotates the catch against the spring 36 and releases its engagement with the tongue 31 as shown in FIG. 10, allowing the tongue to be withdrawn to release the chin strap. The recess 38 may be partially covered by a shroud (not shown) forming part of the outer skin 12. The fastening may be reversed so that the push button 37 is on the inside. The push button 37 may be replaced by a pull catch (not shown) arranged to rotate the catch 33 in the same way as the push button 37.

Although, in the embodiments illustrated, the outer shell has two skins, it is also possible to use more than one pair of skins. Thus it may comprise two pairs of closely-spaced skins, the pairs being separated by an interspace containing a honeycomb material and foam as described above, and joined to one another at the edge of the shell. In effect, each skin of the double-skinned outer shell is thus duplicated; the spaces inside the duplicated skins themselves may be filled with foamed and/or honeycomb material.

In another alternative, the double-skinned outer shell may have an intermediate skin or partition substantially parallel with the inner and outer skins and dividing the interspace into inner and outer portions. Each portion may then accommodate a honeycomb layer, and the cell axes may be angled differently in the inner and outer portions. For example, the cells in the inner portion may be at right angles to the skins while those in the outer portions are angled as shown in FIG. 4, to provide the most effective shock-absorbing compression in response to tangential impacts on the temporal areas.

What we claim as our invention and desire to secure by Letters Patent is:

1. A safety helmet comprising:
    an outer shell formed as a double-skinned member having an inner skin and an outer skin, said skins of said shell being joined to one another around the periphery of said shell by a gently curved peripheral portion exhibiting no sharp edges, said peripheral portion having spaced-apart wall means extending into an interspace formed between said skins, said spaced-apart wall means defining a recess in said interspace, said interspace containing a layer of shock-absorbing material attached to the inside of said outer shell for absorbing impact energy on deformation, said interspace containing a soft lining disposed inside said layer of shock-absorbing material, and said helmet having a chin strap, said chin strap having a plug-in type fastener means receivable in said recess.

2. In the safety helmet of claim 1:
    said plug-in type fastener means having an aperture therein; and a manually releasable spring catch means carried within said shell and cooperating with said aperture for retaining said plug-in type fastener means within said recess.

References Cited

UNITED STATES PATENTS

| 2,289,345 | 7/1942 | Craig et al. | 2—6 |
| 2,333,987 | 11/1943 | Dandy | 2—3 |
| 2,664,567 | 1/1954 | Nichols | 2—3 |
| 2,768,919 | 10/1956 | Bjorksten et al. | 2—3 XR |
| 3,043,730 | 7/1962 | Adie | 16—68 XR |

FOREIGN PATENTS

| 1,257,798 | 2/1961 | France. |
| 332,994 | 8/1930 | Great Britain. |
| 853,461 | 11/1960 | Great Britain. |
| 254,900 | 9/1927 | Italy. |

JAMES R. BOLER, *Primary Examiner.*